United States Patent [19]

Zecher et al.

[11] 4,187,365

[45] Feb. 5, 1980

[54] PROCESS FOR THE PRODUCTION OF POLYCONDENSATE CONTAINING CYCLIC IMIDE GROUPS

[75] Inventors: Wilfried Zecher; Werner Clarenz; Willi Dunwald; Rudolf Merten, all of Leverkusen, Fed. Rep. of Germany

[73] Assignee: Bayer Aktiengesellschaft, Fed. Rep. of Germany

[21] Appl. No.: 906,259

[22] Filed: May 15, 1978

Related U.S. Application Data

[63] Continuation-in-part of Ser. No. 788,112, Apr. 18, 1977, abandoned, which is a continuation of Ser. No. 610,989, Sep. 8, 1975, abandoned.

[30] Foreign Application Priority Data

Sep. 12, 1974 [DE] Fed. Rep. of Germany ....... 2443576
Sep. 12, 1974 [DE] Fed. Rep. of Germany ....... 2443575

[51] Int. Cl.$^2$ .................. C08G 18/00; C08G 73/10
[52] U.S. Cl. .................................. 528/45; 528/49; 528/52; 528/73

[58] Field of Search ......... 260/47 CB, 47 CP, 78 TF, 260/77.5 R, 30.6 R, 32.6 N, 33.4 P; 427/388, 369, 370, 409; 528/45, 49, 52, 73

[56] References Cited

U.S. PATENT DOCUMENTS

| | | | |
|---|---|---|---|
| 3,578,639 | 5/1971 | Sheffer | 260/47 CB |
| 3,914,505 | 10/1975 | Dacloux | 427/388 R |

*Primary Examiner*—Lester L. Lee
*Attorney, Agent, or Firm*—Connolly and Hutz

[57] ABSTRACT

A process for the production of polycondensates linked by cyclic imide groups, wherein at least one organic polyisocyanate or masked isocyanate, formic acid and at least one cyclic dicarboxylic acid anhydride compound which, in addition to the cyclic anhydride group, is substituted at least once by another cyclic anhydride, carboxyl, carbalkoxy, carbaroxy or SO$_3$H group, are polycondensed at temperatures in the range from 0° to 450° C.

2 Claims, No Drawings

PROCESS FOR THE PRODUCTION OF POLYCONDENSATE CONTAINING CYCLIC IMIDE GROUPS

CROSS-REFERENCE TO RELATED APPLICATIONS

This application is a continuation-in-part of application Ser. No. 788,112 filed Apr. 18, 1977 and now abandoned which in turn is a continuation of application Ser. No. 610,989 filed Sept. 8, 1975 and now abandoned.

This invention relates to a process for the production of polycondensates containing imide groups by reacting polycarboxylic acid anhydrides, formic acid and polyisocyanates, and to their use for coating metals, preferably lacquering wires or for the production of films and laminates.

It is known that polyimides and polyamide imides can be obtained by reacting polyfunctional isocyanates with polycarboxylic acid anhydrides (German Auslegeschrift No. 1,256,418 and French Pat. No. 1,375,461).

These polymers are used, for example, as binders for anticorrosive and decorative lacquers as wire lacquering and as insulating films by virtue of their thermal stability, their extreme hardness coupled with high elasticity, by the complete absence of thermoplasticity, by their extremely high resistance to solvents and by their good adhesion to metals, especially aluminium. Unfortunately, the strong natural colour of poly(amide)imides and the inadequate covering power of pigmented one-coat lacquers produced from them have proved to be disadvantageous in the field of decorative coatings. Brilliant colour, especially white lacquer finishes, cannot be obtained. In addition, the gloss of the lacquer finishes is only just adequate.

Moreover, the extremely high viscosity of the polymer solutions obtained by the various known processes is a considerable disadvantage for wire lacquering. Accordingly, only solutions having a low solids content can be used without difficulty for lacquering. This results in a high consumption of solvents which is undesirable not only in regard to economy, but also in regard to pollution. Reducing the viscosity by reducing the size of the molecules of the polymers present in solution has not proved to be practical, because a longer stoving time is required for building up the molecule to the sizes required for good lacquers. In addition, a considerable part of the condensation reaction, which otherwise takes place in solution, takes place on the wire, so that the lacquer film is in greater danger of being permeated by small gas bubbles. Therefore, only relative low lacquering rates are possible by using the polyamide imides obtained by conventional processes. Accordingly, in cases where poly(amide)imides are used for surface lacquering, difficulties are always involved in adapting the stoving conditions of the base lacquer to those of the surface lacquer.

It has now surprisingly been found that the disadvantages referred to above can be obviated by using, for the production of lacquers, imide-group containing polycondensates, preferably poly(amide)imides, obtained by polycondensing polycarboxylic acid anhydrides, polyisocyanates and formic acid.

Accordingly, the present invention relates to a process for the production of polycondensation products linked by cyclic imide groups, wherein at least one organic polyisocyanate or masked polyisocyanate, formic acid and at least one cyclic dicarboxylic acid anhydride compound which, in addition to the cyclic anhydride group, are substituted at least once by another cyclic anhydride carboxyl, ester or $SO_3H$-group, are polycondensed, in a solvent, at temperatures in the range from 0° to 450° C.

The invention also relates to the use of these imide-group-containing polycondensates for lacquering metals, especially wires, for the production of films or laminates.

It has been found that the condensation products containing imide groups according to the invention are far more suitable for use as binders for metal coatings than conventional polyamide imides. Lacquers produced from the polycondensates according to the invention are distinctly lighter and show outstanding gloss without any deterioration in their mechanical properties. In addition, it is possible to produce lacquers having more brilliant colours, and the colour retention of the coating under the effect of thermal ageing is also better. In this connection, it was not possible to detect any reduction in hardness, thermoplasticity, mechanical properties and adhesion to metals. Owing to the relatively low viscosity of the polymers it is possible not only to use lacquer solutions having a high solids content, but also contrary to expectation, to obtain much higher lacquering rates than is possible in the case of non-regulated polycondensates. Accordingly, it is possible owing to this higher lacquering rate to apply coatings to base lacquers of the type which are normally unable to withstand the temperatures required for stoving poly(amide)imide lacquer solutions. Accordingly, the selection of multi-layer lacquered based on polyvinyl acetals, polyurethanes, epoxide resins, polyamides, polyamide phenolic resins or acrylonitrile copolymers, may be provided with surface lacquers of polyamide imides or polyimides without detrimentally affecting the necessary stoving process.

Starting components suitable for the invention process are aliphatic, cycloaliphatic, araliphatic, aromatic and heterocyclic polyisocyanates (cf. Annalen 562, pages 75 to 136) for example ethylene diisocyanate, 1,4-tetramethylene diisocyanate, 1,6-hexamethylene diisocyanate, 1,12-dodecane diisocyanate, cyclobutane-1,3-diisocyanate, cyclohexane-1,3- and -1,4-diisocyanate and any mixtures of these isomers, 1-isocyanato-3,3,5-trimethyl-5-isocyanato methyl cyclohexane (German Auslegeschrift No. 1,202,785), 2,4-and 2,6-hexahydro tolylene diisocyanate and any mixtures of these isomers, hexahydro-1,3-and/or-1,4-phenylene diisocyanate, perhydro-2,4' and/or 4,4'-diphenyl methane diisocyanate, 1,3-and 1,4-phenylene diisocyanate, 2,4- and 2,6-tolylene diisocyanate and any mixtures of these isomers, diphenyl methane- 2,4'- and/or -4,4'-diisocyanate, naphthylene-1,5-diisocyanate, triphenyl methane 4,4', 4''-triisocyanate, polyphenyl-poly-methylene polyisocyanates of the type obtained by condensing aniline with formaldehyde, followed by phosgenation, and described in, for example, British Pat. Nos. 874,430 and 848,671, perchlorinated aryl polyisocyanates of the type described in, for example, German Auslegeschrift No. 1,157,601, polyisocyanates containing carbodiimide groups of the type described in German Pat. No. 1,092,007, diisocyanates of the type described in U.S. Pat. No. 3,492,330, polyisocyanates containing allophanate groups of the type described in, for example, British Pat. No. 994,890, Belgian Pat. No. 761,626 and published Dutch patent application No. 7,102,524, polyisocyanates containing isocyanurate groups of the type described in, for example, German Pat. Nos. 1,022,789; 1,222,067 and 1,027,394 and German Offenlegungsschrifts Nos. 1,929,034 and 2,004,048, polyisocyanates containing urethane groups of the type described in, for example, Belgian Pat. No. 752,261 or U.S. Pat. No. 3,394,164, polyisocyanates containing acylated urea groups according to German Pat. No. 1,230,778, polyisocyanates containing biuret groups of the type described in, for example, German Pat. No. 1,101,394, British Pat. No. 889,050 and French Pat. No. 7,017,514, polyisocyanates produced by telomerisation reactions of the type described in, for example, Belgian Pat. No. 723,640, polyisocyanates containing ester groups of the type described in, for example, British Pat. Nos. 956,474 and 1,072,956, U.S. Pat. No. 3,567,763 and German Pat. No. 1,231,688 and reaction products of the above-mentioned isocyanates with acetals according to German Pat. No. 1,072,385.

It is also possible to use the distillation residues containing isocyanate groups which accumulate during the commercial production of isocyanates, optionally in solution in one or more of the above-mentioned polyisocyanates. Any mixtures of the above-mentioned polyisocyanates may also be used.

Preferred polyisocyanates correspond to the general formula:

$$R^2(-NCO)_z$$

in which $R^2$ represents an optionally substituted alkyl radical having 1 to 20 carbon atoms, any aryl radical having 5 to 12 carbon atoms, a cycloalkyl radical having 5 to 12 carbon atoms, an alkyl aryl radital having 6 to 20 carbon atoms and an aryl or cycloalkyl radical having 5 to 12 carbon atoms containing hetero atoms such as N, O or S, and z is an integer from 2 to 4, preferably 2 or 3.

It is preferred to use the commercially readily available mixtures of tolylene diisocyanates, m-phenylene diisocyanate, also phosgenated condensates of aniline and formaldehyde having a polyphenylene-methylene structure and the symmetrical compounds 4,4'-diisocyanato diphenyl methane, 4,4'-diisocyanato diphenyl ether, p-phenylene diisocyanate, 4,4'-diisocyanato diphenyl dimethyl methane, analogous, hydroaromatic diisocyanates and aliphatic diisocyanates having 2 to 6 carbon atoms, such as hexamethylene diisocyanate.

The isocyanates may be used in free form and also partly or completely masked in the form of their derivatives obtained by reaction with compounds containing reactive hydrogen which can be used as isocyanate donors under the reaction conditions.

Preferred donors, masked isocyanates, are the carbamic acid esters obtained from aromatic and aliphatic mono-and polyhydroxy compounds which correspond, for example, to the general formulae:

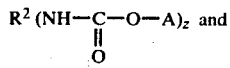

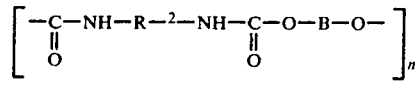

in which $R^2$ and z are as defined above, A represents the organic radical of a monohydroxy compound and B the organic radical of a bis- or tris-functional hydroxy compound, preferably an alkyl radical having 1 to 10 carbon atoms, a cycloalkyl radical having 5 to 10 carbon atoms, an alkyl aryl radical having 7 to 12 carbon atoms or an aryl radical having 6 to 12 carbon atoms, n is an integer from 1 to 1000 preferably 1 to 500. The radicals may also be substituted.

Examples of carbamic acid esters of this kind are the carbamic esters of phenol, isomeric cresols, their commercial-grade mixtures and similar aromatic hydroxyl compounds, aliphatic monoalcohols such as methanol, ethanol, propanol, isopropanol, butanol, isobutanol, cyclohexanol, benzyl alcohol and aliphatic diols or polyols, such as ethylene glycol and trimethylol propane.

The O-alkyl urethanes may either be used as such or may be produced in situ by reaction with alcohols.

Instead of using the above-mentioned polyisocyanates, it is also possible to use the analogous polyisothiocyanates as starting materials.

Preferred cyclic dicarboxylic acid anhydride compounds are cyclic dicarboxylic acid anhydride compounds corresponding to the general formula:

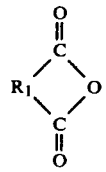

in which $R_1$ represents an optionally substituted aliphatic, cycloaliphatic, heterocyclic, aliphatic-aromatic or aromatic radical which, in addition to the cyclic anhydride group, is substituted at least once be another functional group, such as a cyclic anhydride group, a carboxyl, a carbalkoxy, a carbaroxy or $SO_3H$-group.

The following are examples of the carboxylic acid anhydrides which may be used:

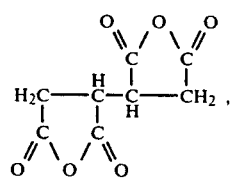 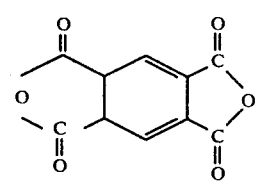 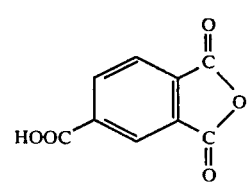

-continued

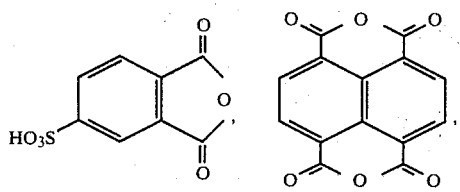 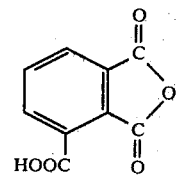

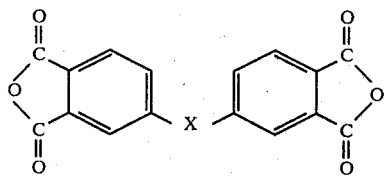  $X = -O-, -S-, -SO_2-,$
$-\underset{\underset{O}{\|}}{C}-, -N=N-,$

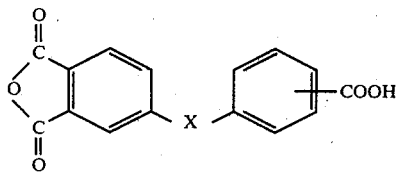 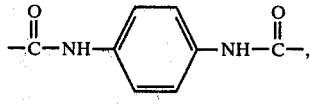

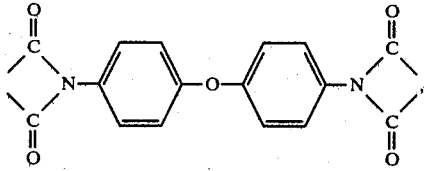

$X = -NH-\underset{\underset{O}{\|}}{C}-\underset{}{\bigcirc}-\underset{\underset{O}{\|}}{C}-NH-,$ $-\underset{\underset{O}{\|}}{C}-NH-\bigcirc-\bigcirc-NH-\underset{\underset{O}{\|}}{C}-,$

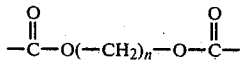

n = 1-4, preferably 2    $-\underset{\underset{O}{\|}}{C}-O(-CH_2)_n-O-\underset{\underset{O}{\|}}{C}-$ or $-\underset{\underset{O}{\|}}{C}-O-\bigcirc-O-\underset{\underset{O}{\|}}{C}-$

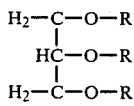   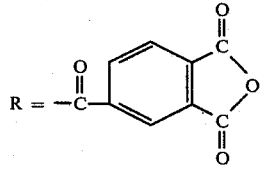

Instead of using the carboxylic acid anhydrides, it is also possible to use other acid derivatives or the polycarboxylic acid itself, for example the corresponding phenyl esters which may be converted during the reaction into acid anhydrides. Trimellitic acid anhydride is preferably used. The reaction according to the invention may be carried out in inert solvents which do not react under the reaction conditions or which form only those loose addition compounds which further react.

Suitable solvents are optionally halogenated hydrocarbons, phenols, esters, ketones, ethers, substituted amides, nitriles, phosphoric acid amides, sulphoxides and sulphones, for example xylenes, o-dichlorobenzene, phenol, cresols, acetophenone, cyclohexanone, glycol monomethyl ether acetate, N-methyl pyrrolidone, dimethyl formamide, dimethyl acetamide, benzonitrile, hexamethyl phosphoric acid triamide, dimethyl sulphoxide, tetramethylene sulphone and mixtures thereof.

In view of the much higher lacquering rates possible when operating the process of the present invention in the presence of either N-methyl pyrrolidone or dimethyl acetamie or a mixture thereof without decrease in softening temperature, these two solvents are especially preferred.

The process according to the invention is carried out by keeping the reaction components for a few minutes to several hours at temperatures in the range from 0° to 450° C. in the presence of a solvent. The reaction is over when the evolution of gas stops and viscosity increases. In some cases, it is advantageous to carry out the reaction in several stages or to add the individual components in a different order or at different temperatures. Thus, an adduct or condensate may be prepared in a first stage, for example in a solvent, and may be subsequently converted into the high molecular weight condensation product at elevated temperatures with evaporation of any solvent present, and chain extension or cross-linking.

In some cases, it is advisable to carry out the reaction under an inert gas atmosphere, such as nitrogen or argon. The reaction may be carried out either continuously or in batches, or even under pressure in an autoclave, for example in order to reach a higher reaction temperature.

Generally it is advantageous to react the polyisocyanates and the polycarboxylic acid anhydrides in equivalent amounts to the reactive groups or to an excess of up to 10% of isocyanate or carboxylic acid groups, although even fairly considerably deviations from these stoichiometric ratios are also possible.

The formic acid is used in quantities of from 0.1 to 40 mol % and preferably in quantities of from 2 to 15 mol %, based on the isocyanate. In addition, the condensation products may be modified by using and incorporating, for example, polyols, polycarboxylic acids, polycarbamic acid esters and also polyesters and polyethers. Examples include ethylene glycol, trimethylol propane, isophthalic acid, trimesic acid, a polycarbamic acid ester of 2,4-tolylene diisocyanate and ethylene glycol, a polyester of terephthalic acid, ethylene glycol and glycerol and a polyether of bis-(hydroxy phenyl)-propane and epichlorhydrin.

The reaction according to the invention may be influenced by catalysts, for example boron trifluoride and its adducts, amines such as triethylamine, 1,4-diaza-bicyclo-(2,2,2)-octane, N-ethyl morpholine and N-methyl imidazole, phenols such as phenol and m-cresol and organic and inorganic metallic compounds, especially of iron, lead, zinc, tin, copper, cobalt and titanium, such as iron (III) chloride, cobalt acetate, lead oxide, zinc octoate, dibutyl tin dilaurate, copper acetyl acetonate and titanium tetrabutylate, and phosphorus compounds such as trialkyl phosphine and 1-methyl phospholine oxide.

The imide-group-containing polycondensates according to the invention, preferably poly(amide)imides which may be optionally modified by admixture with polyesters, are eminently suitable for the production of high-temperature-resistant metal coatings. The lacquers according to the invention may be applied to metal plate of any kind in known manner. Aluminium or steel plate is preferably coated. They are also eminently suitable for the production of high temperature-resistant wire lacquers, films or laminates which may optionally be modified by admixture with polyesters. The films and laminates are produced by known methods by casting the polymer solution onto a substrate and evaporating the solvent. In wire lacquering, the wire generally passes through a lacquer bath subsequent to which the excess lacquer is stripped off by means of a special stripper system. The stripper system may consist of two felts pressed onto one another through which the wire is guided. However, this required a lacquer of relatively low viscosity, as is the case with polycondensates regulated in accordance with the invention. Accordingly, a solids content of up to about 40%, preferably from 20 to 30%, is desirable. The diameter of the wire to be lacquered is also an important factor. The increases in the diameter of the wire obtained by lacquering are laid down in DIN Specification 46 453 and 46 435. A solution with a relatively high solids content is normally stripped by means of metallic stripper nozzles. The wire then passes through a stoving oven in which the solvent is evaporated and the lacquer film hardened under the effect of heat. This process is repeated until the required layer thickness has been obtained. From 6 to 8 passes are generally required for this purpose.

EXAMPLE 1

(a) 192 g of trimellitic acid anhydride, 253 g of 4,4'-diisocyanatodiphenyl methane and 4.6 g of formic acid are introduced into 501 g of N-methyl pyrrolidone, followed by stirring for 4 hours at 85° C. Condensation is accompanied by the evolution of gas and is completed over a period of 4 hours at 120° C. and 1 hour at 140° C. The reaction product is obtained in the form of a brown viscous solution and, its infrared spectrum, shows bands characteristic of imide groups at 1720 cm$^{-1}$ and 1175 cm$^{-1}$. The solution has a viscosity of 25,800 mPa s at 20° C.

The solution thus obtained is diluted to a solids content of 30% with a solvent mixture of N-methyl pyrrolidone and xylene in a ratio of 1:9. The dilute solution has a viscosity of 950 mPa s.

A 0.7 mm diameter copper wire is lacquered with this solution to a diameter of 0.75 mm in a wire lacquering machine.

| furnace length: | 4 metres |
| --- | --- |
| furnace temperature: | 400° C. |
| stripper system: | nozzles |
| number of passes: | 6 |

Under these conditions, the take-off rate of the wire can be increased up to 19 meters per minutes without any deterioration in the properties of the lacquer, especially its softening temperature. The lacquer has a softening temperature of 380° C., as measured in accordance with DIN 46 453/5.2.3.

(b) Comparison Example without formic acid:

500 g of 4,4'-diisocyanatodiphenyl methane are added to a solution of 384 g of trimellitic acid anhydride in 1680 g of N-methyl pyrrolidone, and the mixture stirred for 6 hours at 80° C. and for another 6 hours at 200° C. A light brown solution having a solids content of approximately 30% is obtained, its viscosity amounting to 15,000 mPa s.

In order to obtain a viscosity suitable for processing, the solution has to be diluted to a solids content of at least 24%. The maximum take-off rate of the wire which can be obtained during lacquering amounts to 14 meters per minute.

EXAMPLE 2

(a) For lacquering a 0.1 mm diameter wire, the lacquer solution prepared in accordance with Example 1(a) is diluted to a solids content of 23% with a solvent mixture of N-methyl pyrrolidone and xylene in a ratio of 1:2. The viscosity of the dilute solution, amounting to 38 seconds (DIN 53 211) number 4 cup), enables the felt stripper system to be used. Under the following lacquering conditions:

horizontal furnace: 125 meters long
 furnace temperature: inlet 450° C., outlet 500° C.
 number of passes: 6
  it was possible to obtain wire with excellent properties up to a take-off rate of 130 meters per minute.
  The wires thus lacquered had a softening temperature of 380° C., as measured in accordance with DIN 46 453/5.2.3.

(b) The comparison lacquer obtained in accordance with (1b) has to be diluted to a solids content of approximately 17% in order to reach the same viscosity suitable for lacquering. However, the maximum take-off rate which can be obtained with this solution amounts to only 80 meters per minute.

EXAMPLE 3

A 0.108 mm diameter polyurethane lacquered wire is lacquered in two passes to a diameter of 0.112 mm with the lacquer solution obtained in accordance with Example 2(a) having a solids content of 23% without the polyurethane film undergoing any heat damage. The stoving conditions are the same as in Example 2(b). The lacquer has a softening temperature of 380° C., as measured in accordance with DIN 46 453/5.2.3.

EXAMPLE 4

A 0.7 diameter lacquered wire is provided in a single operation with 4 coats of lacquer A and then with 2 coats of lacquer B.

Lacquer A is obtained by diluting a mixture of 100 parts by weight of polyvinyl formal having an OH-content of 5 to 6%.
60 parts by weight of masked polyisocyanate, obtained by reacting tolylene diisocyanate, trimethylol propane, butylene glycol and phenol,
5 parts by weight of a melamine-formaldehyde resin,
5 parts by weight of a phenol formaldehyde resin into a 22% solution with a solvent mixture of cresol and xylene in ratio of 7:3.

Lacquer B is obtained by diluting 1000 parts by weight of the lacquer solution obtained in accordance with Example 1(a) with 400 parts by weight of xylene. The dilute solution has a viscosity of 800 mPa s. The solution may be used in this concentration for wire lacquering.

| | |
|---|---|
| furnace length: | 4 metres |
| furnace temperature: | 400° C. |
| application system: | nozzles |
| take-off rate: | 11–15 m/min |
| increase in diameter by lacquering | 55 μm |

In this case, the heat effect required for hardening the polyamide imide film does not damage the base by virtue of the high take-off rate. The softening temperature amounts to 380° C., as measured in accordance with DIN 46 453/5.2.3.

EXAMPLE 5

80.1 g of phenylene-1,3-diisocyanate, 126.1 g of 4,4'-diisocyanatodiphenyl ether, 192 g of trimellitic acid anhydride and 6.9 g of formic acid, are introduced into 470 g of N-methyl pyrrolidone, followed by stirring for 4 hours at 80° C. for 4 hours at 120° C. and for 2 hours at 140° C. The reaction product is a brown viscous solution having a viscosity of 1100 mPa s. A woven glass-filament fabric is impregnated with the solution and dried in air. This is followed by precondensation for 20 minutes at approximately 150° C. Several fabrics impregnated in this way are then placed one on top fo the other and hardened under pressure at elevated temperature in a press. The pressure should not exceed 50 kg/cm² during the first few minutes, and may then be increased to approximately 150 kg/cm². The temperature of the press is between 180° and 200° C. The total residence time in the press is governed by the number of layers. It amounts to about 10 minutes for a panel approximately 3 mm thick. A solid heat-resistance laminate is obtained.

EXAMPLE 6

18.4 g of a 10% solution of formic acid in dimethyl acetamide are added dropwise at 70° C. to a solution of 340 g of tolylene-(2,4)-diisocyanate and 384 g of trimellitic acid anhydride in 1280 g of N-methyl pyrrolidone. This is followed by stirring for 5 hours at 80° C., for 4 hours at 120° C. and for 2 hours at 130° C. A light brown solution of the condensation product is obtained. Imide bands: 1720 cm$^{-1}$ and 1780 cm$^{-1}$. Viscosity $\eta_{20}$:4460 mPa s..

The solution thus prepared is applied using a casting machine in a predetermined thickness to a heat-resistant substrate which may consist, for example, of metal or glass and from which the completed film may readily be removed. The solvent is evaporated and the film hardened to completion by heating to a temperature of from 140° to 200° C. The film thus produced shows favourable mechanical properties and high thermal stability.

The imide-group-containing polycondensates according to the invention, preferably poly(amide)imide which may be optionally modified by admixture with polyesters, are eminently suitable for the production of high-temperature-resistant metal coatings. The lacquers according to the invention may be applied to metal plate of any kind in known manner. Aluminium or steel plate is preferably coated.

EXAMPLE 7

I (a) 192 g of trimellitic acid anhydride, 250 g of 4,4'-diisocyanato diphenyl methane and 2.8 g of formic acid are stirred in 365 g of dimethyl acetamide for 1 hour at 65° C., for 4 hours at 85° C. and for 4 hours at 120° C. A light viscous solution of the imide-group-containing condensation product is obtained. The infrared spectrum of the condensation product shows the typical imide bands at 1720 cm$^{-1}$ and 1775 cm$^{-1}$. After dilution with 485 g of N-methylpyrrolidone to form an approximately 30% solution, the viscosity $\eta_{20}$ amounts to 1800 mPa s.

(b) 150 g of a 30% solution of the reaction product in N-methyl pyrrolidone/dimethyl acetamide in a ratio of 4.5:6 are stirred with 33.7 g of rutile TiO$_2$ (Bayertitan ®R-FD-I), followed by dilution to a solids content of 39.9% with 71 g of a solvent mixture of N-methyl pyrrolidone and dimethyl acetamide (4.5:6). The resulting solution has a flow-out time of 50 seconds, as measured in accordance with DIN 53 211.

The lacquer is sprayed onto an aluminium or Erichsen plate and stoved for 10 minutes at 250° C. The lacquer is then tested for gloss according to Gardner at 60° C. Erichsen value (E) according to DIN 53 156, pencil hardness according to DIN 46 453 and impact indentation using a type 304 Gardner ball impact tester. The results are shown in Table 1.

(c) 150 g of a 30% solution of the condensation product obtained as described above in N-methyl pyrrolidone/dimethyl acetamide (4.5:6) are stirred with 33.7 g of rutile TiO$_2$ (Bayertitan ®R-FD-I) and the resulting solution diluted with 60.2 g of dimethyl formamide to form a solution with a solids content of 32.3%.

This solution has a flow-out time of 50 seconds, as measured in accordance with DIN 53 211.

The lacquer solution is sprayed onto an aluminium or Erichsen plate and stoved for 10 minutes at 250° C. The properties of the lacquer, determined as described above, are set out in Table 1.

II (a) Comparison Example without formic acid:

500 g of 4,4'-diisocyanato diphenyl methane are added to a solution of 384 g of trimellitic acid anhydride in 1680 g of N-methyl pyrrolidone, and the mixtures stirred for 6 hours at 80° C. and then for another 6 hours at 200° C. A 30% light-brown solution is obtained.

(b) 33.7 g of rutile TiO$_2$ (Bayertitan ®R-FD-I) are stirred into 150 g of this solution, followed by dilution with 140 g of dimethyl acetamide to form a solution having a solids content of 24.3%. This solution has a flow out time of 50 seconds, as measured in accordance with DIN 53 211.

The lacquer solution is applied as described in I (b) and the properties of the lacquer determined in accordance with I (b), are set out in Table 1.

(c) 47.5 of rutile TiO$_2$ (Bayertitan ®R-FD-I) are stirred into 200 g of a 30% solution of the polyamide imide obtained as described above, and the solution diluted to a solids content of 25.1% with 240 g of a solvent mixture of 20 parts of N-methyl pyrrolidone, 10 parts of xylene, 3 parts of ethyl glycol and 3 parts of methanol. This solution has a flow-out time of 50 seconds.

The solution is stoved to form a lacquer in the same way as described in I(b), the properties of this lacquer being set out in Table I.

340 g of tolylene-2,4-diisocyanate and 384 g of trimellitic acid anhydride in 1280 g of N-methyl pyrrolidone. This is followed by stirring for 5 hours at 80° C., for 4 hours at 120° C. and for 2 hours at 130° C. A light brown solution of the condensation product is obtained. Imide bands: 1720 cm$^{-1}$ and 1780 cm$^{-1}$ Viscosity: $\eta_{20}$=4460 m Pa s.

EXAMPLE 10

96 g of trimellitic acid anhydride, 1.4 g of formic acid and 140.4 g of bis-[4-isocyanato phenyl]-propane are stirred in 250 g of N-methyl pyrrolidone and 192 g of dimethyl acetamide for 6 hours at 80° C., for 4 hours at 120° C. and for 2 hours at 130° C. A light brown viscous lacquer solution with a viscosity of 960 m Pa s is obtained. The solution is diluted with xylene and stoved at 200° and 300° C. to form an elastic lacquer film.

EXAMPLE 11

80.1 g of phenylene-(1,3)-diisocyanate, 126.1 g of 4,4'-diisocyanatodiphenyl ether, 192 g of trimellitic acid anhydride and 6.9 g of formic acid are introduced into 470 g of N-methyl pyrrolidone, followed by stirring for 4 hours at 80° C., for 4 hours at 120° C. and for 2 hours at 140° C. The reaction product is a brown viscous solution which is coated onto a plate and stoved first at 200° C. and then at 300° C. to form a clear elastic lacquer film. The solution is characterised by imide bands at 1715 cm$^{-1}$ and 1775 cm$^{-1}$. Viscosity: $\eta_{20}$=1100 m Pa s.

We claim:

1. A process for the production of polycondensates

Table 1

| colur | lacquer | layer thickness (μm) | gloss 60% Gardner | E-value (mm) | hardness zone 20° C. | hardness zone 180° C. | impact indentation compression zone (inch.p.) | impact indentation tensile (inch.p.) |
|---|---|---|---|---|---|---|---|---|
| lighter | I (b) | 10 | 75 | 6.8 | >7H | >7H | 34 | 34 |
| darker | II (b) | 9–10 | 57 | 7.1 | >7H | >7H | 34 | 40 |
| ligher | I (c) | 13 | 100 | 6.8 | 7H | 7H | 34 | 34 |
| darker | II (c) | 8 | 57 | 7.1 | 7H | 7H | 34 | 38 |

EXAMPLE 8

192 g of trimellitic acid anhydride, 253 g of 4,4'-diisocyanato diphenyl methane and 4.6 g of formic acid are introduced into 501 g N-methyl pyrrolidone, followed by stirring for 4 hours at 85° C. Condensation is accompanied by the evolution of gas and is completed over a period of 4 hours at 120° C. and 1 hour at 140° C. The reaction product is obtained in the form of a brown viscous solution and in its infrared spectrum, shows bands characteristic of imide groups at 1720 cm$^{-1}$ and 1775 cm$^{-1}$. The solution has a viscosity of 25800 mPa s at 20° C.

EXAMPLE 9

18.4 g of a 10% solution of formic acid in dimethyl acetamide are added dropwise at 70° C. to a solution of linked by cyclic imide groups and especially capable of lacquering metals, wherein at least one organic polyisocyanate or masked isocyanate, formic acid and at least one cyclic dicarboxylic acid anhydride compound which, in addition to the cyclic anhydride group, is substituted at least once by another cyclic anhydride, carboxyl, carbalkoxy carbaroxy or SO$_3$H group, are polycondensed at temperatures in the range from 0° to 450° C., said polycondensation being carried out with 0.1 to 40 mol % of formic acid based on the isocyanate compound employed and in the presence of at least one solvent selected from the group consisting of N-methyl pyrrolidone and dimethyl acetamide.

2. A process as claimed in claim 1, wherein from 2 to 15 mol % of formic acid is used.

* * * * *